United States Patent [19]
Johnson et al.

[11] Patent Number: 5,001,628
[45] Date of Patent: Mar. 19, 1991

[54] SINGLE SYSTEM IMAGE UNIQUELY DEFINING AN ENVIRONMENT FOR EACH USER IN A DATA PROCESSING SYSTEM

[75] Inventors: Donavon W. Johnson, Georgetown; Larry K. Loucks, Austin; Charles H. Sauer, Austin; Todd A. Smith, Austin, all of Tex.

[73] Assignee: International Business Machines Corporation, Armonk, N.Y.

[21] Appl. No.: 401,546

[22] Filed: Sep. 1, 1989

Related U.S. Application Data

[63] Continuation of Ser. No. 14,892, Feb. 13, 1987, abandoned.

[51] Int. Cl.$^5$ ...................... G06F 12/08; G06F 13/00
[52] U.S. Cl. ................................ 364/200; 364/282.1; 364/282.3; 364/282.4; 364/283.1
[58] Field of Search ............................... 364/200, 900

[56] References Cited

U.S. PATENT DOCUMENTS

| | | | |
|---|---|---|---|
| 4,558,413 | 12/1985 | Schmidt et al. | 364/300 |
| 4,714,995 | 12/1987 | Materna et al. | 364/200 |
| 4,825,354 | 4/1989 | Agrawal et al. | 364/200 |

OTHER PUBLICATIONS

Chang, "Status Monitor Provides Network Locking Service for NFS", Sun Microsystems, Inc., Mountain View, Calif., pp. 1-3.
Chang "SunNet", Sun Microsystems, Inc., Mountain View, Calif., pp. 71-75.
Sandberg et al., "Design and Implementation of the Sun Network File System", Sun Microsystems, Inc., Mountain View, Calif., pp. 119-130.
Walsh et al., "Overview of the Sun Network File System", Sun Microsystems, Inc., Mountain View, Calif., pp. 117-124.
Taylor et al., "Secure Networking in the Sun Environment", Sun Microsystems, Inc., Mountain View, CA., pp. 28-36.
Olander et al., "A Framework for Networking in System V", AT&T, Summit, N.J., pp. 1-8.
G. Popek et al., "Functionality and Architecture of the LOCUS Distributed Operating System", from Concurrency Control and Reliability in Distributed Systems, Van Nostrand Reinhold Company, Inc., 1987, pp. 154-187.
B. Walker et al., "The LOCUS Distributed Operating System", ACM (Association for Computing Machinery), 1983, 0-89791-115-6/83/010/0049, pp. 49-70.
Tom Houghton, "File System Switch", pp. 1-2.
Richard Hamilton et al., "An Administrator's View of Remote File Sharing", pp. 1-9.
Sun Microsystems, Inc. "Sun-3 Architecture", Aug. 1986, pp. 8-9, 49-57.
Bach, Maurice J., "The Design of the UNIX Operating System", 1986, pp. 382-389.
USENIX; Mach: A New Kernel Foundation for UNIX Development, 1986, pp. 93-112.
Rifkin et al., "RFS Architectural Overview", pp. 248-259.
Kleiman, S. R., "Vnodes: An Architecture for Multiple File System Types in Sun UNIX", pp. 238-247.
Gould, Ed., "The Network File System Implemented on 4.3 BSD", pp. 294-298.
Hughes, Ronald, P., "The Transparent Remote File System", pp. 306-317.
Atlas, Alan; Flinn, Perry; "Error Recovery in a Stateful Remote Filesystem", pp. 355-365.

Primary Examiner—Thomas C. Lee
Assistant Examiner—Robert B. Harrell
Attorney, Agent, or Firm—Whitham & Marhoefer

[57] ABSTRACT

These master system files define the system characteristics that a user at any node in the system can expect to have. The master system files are mounted remotely from each of the nodes of the system and a local copy of the master system files is kept locally reflecting the current contents of the master system file. If a master system file is not available, the local copy is used in read only mode until the node containing the master is available. In addition, each user has its own file tree organization that dictates the necessary remote mounts of directories to enable a user logged on to any node to have the same view of the system that would be obtained from any other node in the system by that user.

25 Claims, 9 Drawing Sheets

FIG. 9A VFS
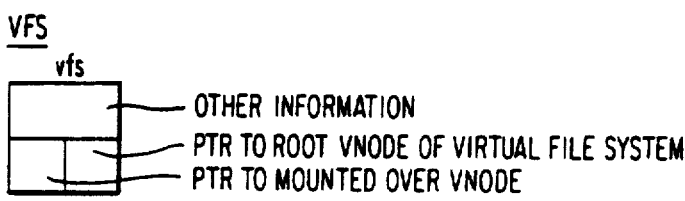
FIG. 9B VNODE
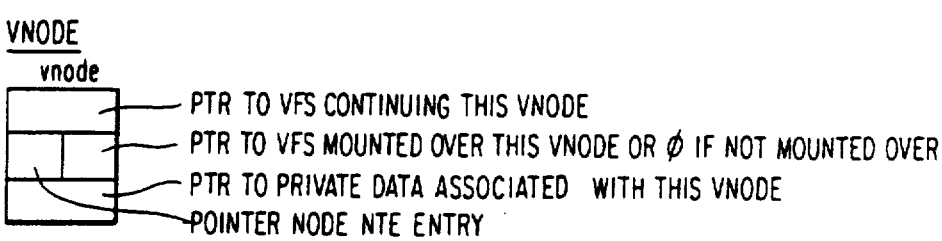
FIG. 9C INODE
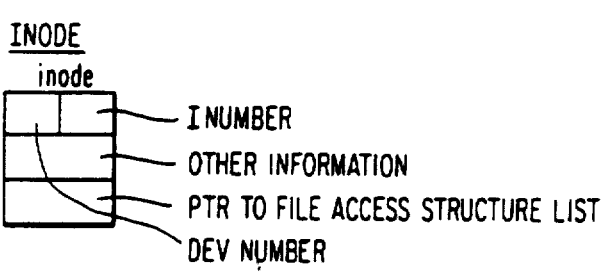
FIG. 9D FILE ACCESS STRUCTURE
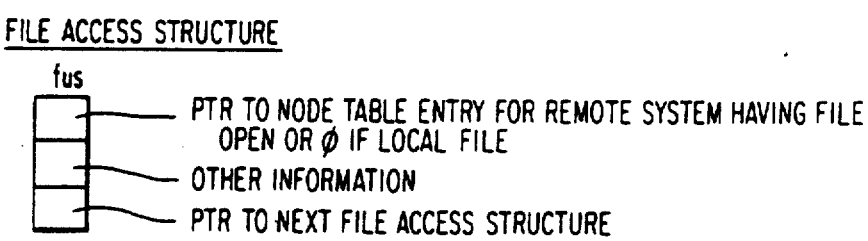
FIG. 9E NODE TABLE ENTRY
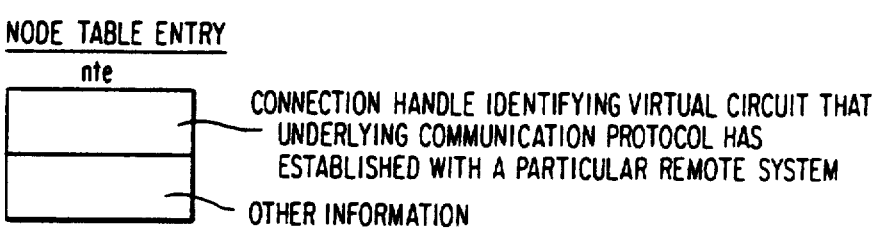
FIG. 9F SURROGATE INODE

SINGLE SYSTEM IMAGE UNIQUELY DEFINING AN ENVIRONMENT FOR EACH USER IN A DATA PROCESSING SYSTEM

This is a continuation U.S. patent application Ser. No. 07/14,892, now abandoned.

CROSS REFERENCE TO RELATED APPLICATIONS

This application is related in subject matter to the following applications filed concurrently herewith and assigned to a common assignee:

Application Ser. No. 07/014,899, now U.S. Pat. No. 4,897,781, filed by A. Chang, G. H. Neuman, A. A. Shaheen-Gouda, and T. A. Smith for A System And Method For Using Cached Data At A Local Node After Re-opening A File At A Remote Node In A Distributed Networking Environment.

Application Ser. No. 07/014,884, now abandoned filed by D. W. Johnson, L. W. Henson, A. A. Shaheen-Gouda, and T. A. Smith for A System and Method for Version Level Negotiation.

Application Ser. No. 07/014,897, now U.S. Pat. 4,887,204, filed by D. W. Johnson, G. H. Neuman, C. H. Sauer, A. A. Shaheen-Gouda, and T. A. Smith for A System And Method For Accessing Remote Files In A Distributed Networking Environment.

Application Ser. No. 07/014,900, now abandoned, filed by D. W. Johnson, A. A. Shaheen-Gouda, T. A. Smith for Distributed File Access Structure Lock.

Application Ser. No. 07/014,891 filed by L. W. Henson, A. A. Shaheen-Gouda, and T. A. Smith for Distributed File and Record Locking.

Application Ser. No. 07/014,888 filed by D. W. Johnson, L. K. Loucks, A. A. Shaheen-Gouda for Interprocess Communication Queue Location Transparency.

Application Ser. No. 07/014,889 filed by D. W. Johnson, A. A. Shaheen-Gouda, and T. A. Smith for Directory Cache Management In A Distributed Data Processing System.

The disclosures of the foregoing co-pending applications are incorporated herein by reference.

BACKGROUND OF THE INVENTION

1. Field of the Invention

This invention generally relates to improvements in operating systems for a distributed data processing system and, more particularly, to an operating system for a multi-processor system interconnected by a local area network (LAN) or a wide area network (WAN). IBM's System Network Architecture (SNA) may be used to construct the LAN or WAN. The operating system according to the invention permits the accessing of files by processors in the system, no matter where those files are located in the system. The invention is disclosed in terms of a preferred embodiment which is implemented in a version of the UNIX[1] operating system; however, the invention could be implemented in other and different operating systems.

[1] Developed and licensed by AT&T. UNIX is a registered trademark of AT&T in the U.S.A. and other countries.

2. Description of the Related Art

Virtual machine operating systems are known in the prior art which make a single real machine appear to be several machines. These machines can be very similar to the real machine on which they are run or they can be very different. While many virtual machine operating systems have been developed, perhaps the most widely used is VM/370 which runs on the IBM System/370. The VM/370 operating system creates the illusion that each of several users operating from terminals has a complete System/370 with varying amounts of disk and memory capacity.

The physical disk devices are managed by the VM/370 operating system. The physical volumes residing on disk are divided into virtual volumes of various sizes and assigned and accessed by users carrying out a process called mounting. Mounting defines and attaches physical volumes to a VM/370 operating system and defines the virtual characteristics of the volumes such as size, security and ownership.

Moreover, under VM/370 a user can access and use any of the other operating systems running under VM/370 either locally on the same processor or remotely on another processor. A user in Austin can use a function of VM/370 called "passthru" to access another VM/370 or MVS/370 operating system on the same processor or, for example, a processor connected into the same SNA network and located in Paris, France. Once the user has employed this function, the files attached to the other operating system are available for processing by the user.

There are some significant drawbacks to this approach. First, when the user employs the "passthru" function to access another operating system either locally or remotely, the files and operating environment that were previously being used are no longer available until the new session has been terminated. The only way to process files from the other session is to send the files to the other operating system and effectively make duplicate copies on both disks. Second, the user must have a separate "logon" on all the systems that are to be accessed. This provides the security necessary to protect the integrity of the system, but it also creates a tremendous burden on the user. For further background, the reader is referred to the text book by Harvey M. Deitel entitled *An Introduction to Operating Systems*, published by Addison-Wesley (1984), and in particular to Chapter 22 entitled "VM: A Virtual Machine Operating System". A more in depth discussion may be had by referring to the textbook by Harold Lorin and Harvey M. Deitel entitled Operating Systems, published by Addison-Wesley (1981), and in particular to Chapter 16 entitled "Virtual Machines".

The invention to be described hereinafter was implemented in a version of the UNIX operating system but may be used in other operating systems having characteristics similar to the UNIX operating system. The UNIX operating system was developed by Bell Telephone Laboratories, Inc., for use on a Digital Equipment Corporation (DEC) minicomputer but has become a popular operating system for a wide range of minicomputers and, more recently, microcomputers. One reason for this popularity is that the UNIX operating system is written in the C programming language, also developed at Bell Telephone Laboratories, rather than in assembly language so that it is not processor specific. Thus, compilers written for various machines to give them C capability make it possible to transport the UNIX operating system from one machine to another. Therefore, application programs written for the UNIX operating system environment are also portable from one machine to another., For more information on the UNIX operating system, the reader is referred to *UNIX System, User's Manual, System V*, published by Western Electric Co., January 1983. A good overview of the UNIX operating system is provided by Brian W. Kernighan and Rob Pike in their book entitled *The Unix Programming Environment*, published by Prentice-Hall (1984). A more detailed description of the design of the UNIX operating system is to be found in a book by Maurice J. Bach, *Design of the Unix Operating System*, published by Prentice-Hall (1986).

AT&T Bell Labs has licensed a number of parties to use the UNIX operating system, and there are now several versions available. The most current version from AT&T is version 5.2. Another version known as the Berkeley version of the UNIX operating system was developed by the University of California at Berkeley. Microsoft, the publisher of the popular MS-DOS and PC-DOS operating systems for personal computers, has a version known under their trademark as XENIX. With the announcement of the IBM RT PC[2] (RISC (reduced instruction set computer) Technology Personal Computer)) in 1985, IBM Corp. released a new operating system called AIX[3] (Advanced Interactive Executive) which is compatible at the application interface level with AT&T's UNIX operating system, version 5.2, and includes extensions to the UNIX operating system, version 5.2. For more description of the AIX operating system, the reader is referred to AIX Operating System Technical Reference, published by IBM Corp., First Edition (Nov. 1985).

[2]RT and RT PC are registered trademarks of IBM Corporation.
[3]AIX is a trademark of IBM Corporation.

The invention is specifically concerned with distributed data processing systems characterized by a plurality of processors interconnected in a network. As actually implemented, the invention runs on a plurality of IBM RT PCs interconnected by IBM's Systems Network Architecture (SNA), and more specifically SNA LU 6.2 Advanced Program to Program Communication (APPC). SNA uses as its link level Ethernet[4], a local area network (LAN) developed by Xerox Corp., or SDLC (Synchronous Data Link Control). A simplified description of local area networks including the Ethernet local area network may be, found in a book by Larry E. Jordan and Bruce Churchill entitled *Communications and Networking for the IBM PC*, published by Robert J. Brady (a Prentice-Hall company) (1983). A more definitive description of communications systems for computers, particularly of SNA and SDLC, is to be found in a book by R. J. Cypser entitled *Communications Architecture for Distributed Systems*, published by Addison-Wesley (1978). It will, however, be understood that the invention may be implemented using other and different computers than the IBM RT PC interconnected by other networks than the Ethernet local area network or IBM's SNA.

[4]Ethernet is a trademark of Xerox Corporation.

As mentioned, the invention to be described hereinafter is directed to a distributed data processing system in a communication network. In this environment, each processor at a node in the network potentially may access all the files in the network no matter at which nodes the files may reside. As shown in FIG. 1, a distributed network environment 1 may consist of two or more nodes A, B and C connected through a communication link or network 3. The network 3 can be a local area network (LAN) as mentioned or a wide area network (WAN), the latter comprising a switched or leased teleprocessing (TP) connection to other nodes or to a SNA network of systems. At any of the nodes A, B or C there may be a processing system 10A, 10B or 10C, such as the aforementioned IBM RT PC. Each of these systems 10A, 10B and 10C may be a single user system or a multi-user system with the ability to use the network 3 to access files located at a remote node in the network. For example, the processing system 10A at local node A is able to access the files 5B and 5C at the remote nodes B and C.

The problems encountered in accessing remote nodes can be better understood by first examining how a standalone system accesses files. In a standalone system, such as 10 shown in FIG. 2, a local buffer 12 in the operating system 11 is used to buffer the data transferred between the permanent storage 2, such as a hard file or a disk in a personal computer, and the user address space 14. The local buffer 12 in the operating system 11 is also referred to as a local cache or kernel buffer. For more information on the UNIX operating system kernel, see the aforementioned books by Kernighan et al. and Bach. The local cache can be best understood in terms of a memory resident disk. The data retains the physical characteristics that it had on disk; however, the information now resides in a medium that lends itself to faster data transfer rates very close to the rates achieved in main system memory.

In the standalone system, the kernel buffer 12 is identified by blocks 15 which are designated as device number and logical block number within the device. When a read system call 16 is issued, it is issued with a file descriptor of the file 5 and a byte range within the file 5, as shown in step 101 in FIG. 3. The operating system 11 takes this information and converts it to a device number and logical block numbers of the device in step 102. Then the operating system 11 reads the cache 12 according to the device number and logical block numbers, step 103.

Any data read from the disk 2 is kept in the cache block 15 until the cache block 15 is needed. Consequently, any successive read requests from an application program 4 that is running on the processing system 10 for the same data previously read from the disk is accessed from the cache 12 and not the disk 2. Reading from the cache is less time consuming than accessing the disk; therefore, by reading from the cache, performance of the application 4 is improved. Obviously, if the data which is to be accessed is not in the cache, then a disk access must be made, but this requirement occurs infrequently.

Similarly, data written from the application 4 is not saved immediately on the disk 2 but is written to the cache 12. This again saves time, improving the performance of the application 4. Modified data blocks in the cache 12 are saved on the disk 2 periodically under the control of the operating system 11.

Use of a cache in a standalone system that utilizes the AIX operating system, which is the environment in which the invention was implemented, improves the overall performance of the system disk and minimizes access time by eliminating the need for successive read and write disk operations.

In the distributed networking environment shown in FIG. 1, there are two ways the processing system 10C in local node C could read the file 5A from node A. In one way, the processing system 10C could copy the whole file 5A and then read it as if it were a local file 5C residing at node C. Reading the file in this way creates a problem if another processing system 10B at node B, for example, modifies the file 5A after the file 5A has been copied at node C. The processing system 10C would not have access to the latest modifications to the file 5A.

Another way for processing system 10C to access a file 5A at node A is to read one block at a time as the processing system at node C requires it. A problem with this method is that every read has to go across the network communications link 3 to the node A where the file resides. Sending the data for every successive read is time consuming.

Accessing files across a network presents two competing problems as illustrated above. One problem involves the time required to transmit data across the network for successive reads and writes. On the other hand, if the file data is stored in the node to reduce network traffic, the file integrity may be lost. For example, if one of the several nodes is also writing to the file, the other nodes accessing the file may not be accessing the latest updated file that has just been written. As such, the file integrity is lost, and a node may be accessing incorrect and outdated files. Within this document, the term "server" will be used to indicate the processing system where the file is permanently stored, and the term client will be used to mean any other processing system having processes accessing the file. The invention to be described hereinafter is part of an operating system which provides a solution to the problem of managing distributed information.

Other approaches to supporting a distributed data processing system in a UNIX operating system environment are known. For example, Sun Microsystems has released a Network File System (NFS) and Bell Laboratories has developed a Remote File System (RFS). The Sun Microsystems NFS has been described in a series of publications including S. R. Kleiman, "Vnodes: An Architecture for Multiple File System Types in Sun UNIX", *Conference Proceedings, USENIX 1986 Summer Technical Conference and Exhibition*, pp. 238 to 247; Russel Sandberg et al., "Design and Implementation of the Sun Network Filesystem", *Conference Proceedings, Usenix 1985*, pp. 119 to 130; Dan Walsh et al., "Overview of the Sun Network File System", pp. 117 to 124; JoMei Chang, "Status Monitor Provides Network Locking Service for NFS"; JoMei Chang, "SunNet", pp. 71 to 75; and Bradley Taylor, "Secure Networking in the Sun Environment", pp. 28 to 36. The AT&T RFS has also been described in a series of publications including Andrew P. Rifkin et al., "RFS Architectural Overview", *USENIX Conference Proceedings*, Atlanta Ga. (June 1986), pp. 1 to 12; Richard Hamilton et al., "An Administrator's View of Remote File Sharing", pp. 1 to 9; Tom Houghton et al., "File Systems Switch", pp. 1 to 2; and David J. Olander et al., "A Framework for Networking in System V", pp. 1 to 8.

One feature of the distributed services system in which the subject invention is implemented which distinguishes it from the Sun Microsystems NFS, for example, is that Sun's approach was to design what is essentially a stateless machine. More specifically, the server in a distributed system may be designed to be stateless. This means that the server does not store any information about client nodes, including such information as which client nodes have a server file open, whether client processes have a file open in read_only or read_write modes, or whether a client has locks placed on byte ranges of the file. Such an implementation simplifies the design of the server because the server does not have to deal with error recovery situations which may arise when a client fails or goes off-line without properly informing the server that it is releasing its claim on server resources.

An entirely different approach was taken in the design of the distributed services system in which the present invention is implemented. More specifically, the distributed services system may be characterized as a "statefull implementation". A "statefull" server, such as that described here, does keep information about who is using its files and how the files are being used. This requires that the server have some way to detect the loss of contact with a client so that accumulated state information about that client can be discarded. The cache management strategies described here, however, cannot be implemented unless the server keeps such state information. The management of the cache is affected, as described below, by the number of client nodes which have issued requests to open a server file and the read/write modes of those opens.

SUMMARY OF THE INVENTION

It is therefore a general object of this invention to provide a distributed services system for an operating system which supports a multi-processor data processing system interconnected in a communications network that provides user transparency as to file location in the network and as to performance.

It is another, more specific object of the invention to provide a technique for giving a user a single system image from any node of a distributed environment.

According to the invention, these objects are accomplished by keeping one set of master system files which each of the distributed nodes uses by creating a set of stub files at the remote node, mounting the master system files onto the stub files, copying the master system files into a set of local system files, unmounting the master system files and deleting the stub files, and mounting the master system files over the local system files. The local copies of the master system files are used in the event that the node containing the master system files is not available. In addition, a file tree for each of the individual users is maintained to allow each user to access the same files from any node in a consistent manner regardless of the node that the user is currently using.

BRIEF DESCRIPTION OF THE DRAWINGS

The foregoing and other objects, aspects and advantages of the invention will be better understood from the following detailed description of the preferred embodiment of the invention with reference to the accompanying drawings, in which:

FIG. 9 is a block diagram of the VFS part of the data structure shown in FIG. 8;

FIG. 9B is a block diagram of the VNODE part of the data structure shown in FIG. 8;

FIG. 9C is a block diagram of the INODE part of the data structure shown in FIG. 8;

FIG. 9D is a block diagram of the FILE ACCESS part of the data structure shown in FIG. 8;

FIG. 9E is a block diagram of the NODE TABLE ENTRY part of the data structure shown in FIG. 8;

FIG. 9F is a block diagram of the SURROGATE INODE part of the data structure shown in FIG. 8;

DESCRIPTION OF THE PREFERRED EMBODIMENT

Figure 1:
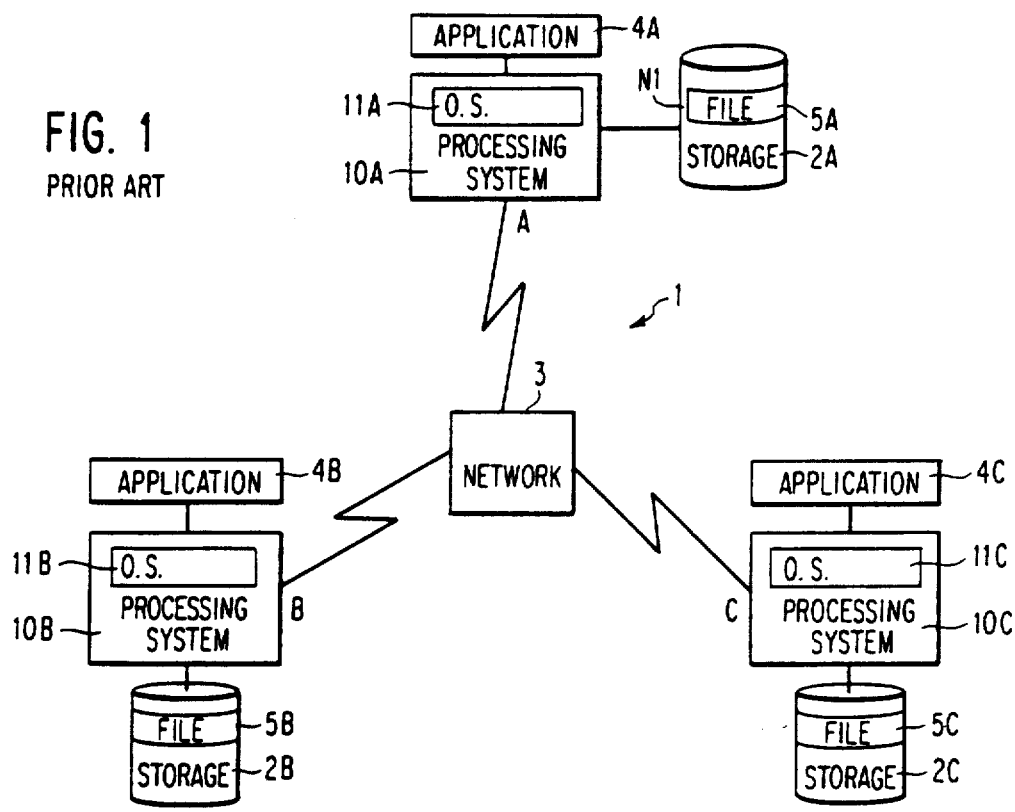
FIG. 1 is a block diagram showing a typical distributed data processing system in which the subject invention is designed to operate.
Figure 2:
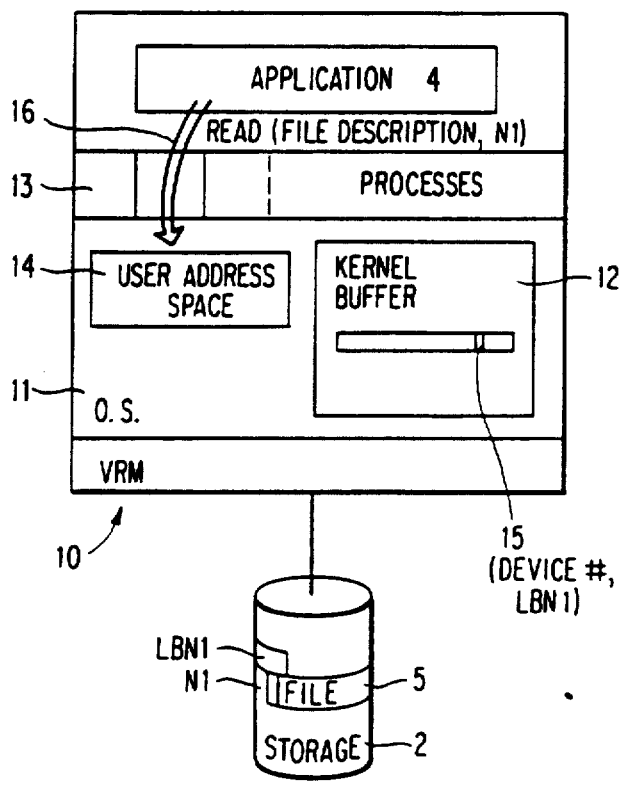
FIG. 2 is a block diagram illustrating a typical standalone processor system.
Figure 3:
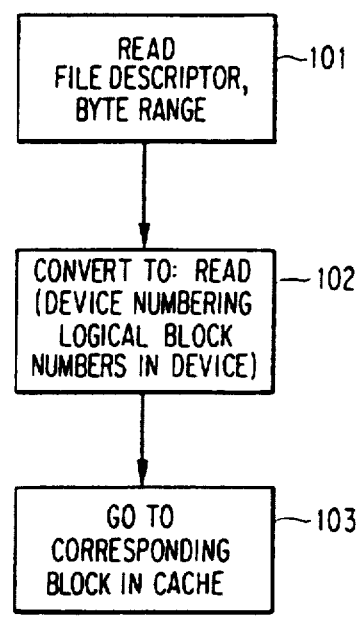
FIG. 3 is a flowchart showing the steps performed by an operating system when a read system call is made by an application running on a processor.

The following disclosure describes solutions to problems which are encountered when creating a distributed file system in which the logic that manages a machine's files is altered to allow files that physically reside in several different machines to appear to be part of the local machine's file system. The implementation described is an extension of the file system of the AIX operating system. Reference should be made to the above-referenced Technical Reference for more information on this operating system. The following specific knowledge of the following AXI file system concepts is assumed: tree structured, also known as hierarchical, file system directories; and file system organization, including inodes.

The essential aspects of a file system that are relevant to this discussion are listed below:

(a) each file on an individual file system is uniquely identified by its inode number (b) directories are files, and thus a directory can be uniquely identified by its inode number.

Note: In some contexts it is necessary to distinguish between files which are directories and files which are not directories (e.g., files which simply contain ordinary data, or other file types supported by UNIX derivative operating systems such as special files or pipes).

In this disclosure the term "simple file" is used to indicate such a non-directory file. Unless otherwise indicated the term "file" may mean either a directory file or a simple file, and, of course, the term "directory" means a directory file.

(c) a directory contains an array of entries of the following form:

name—inode number where the inode number may be that of a simple file or that of another directory.

Note: A directory may contain other directories, which, in turn, may contain other directories or simple files.

Thus a directory may be viewed as the root of a subtree which may include many levels of descendant directories, with the leaves of the tree being "simple files".

In this disclosure the term "descendants" means all of the files which exist in the file tree below a particular directory, even those which can be reached only by going through other directories. The "immediate descendants" of a directory are only those files (simple files or directories) whose names appear in the directory.

(d) by convention, the inode number of the file system's root directory is inode number 2.

The following discussion describes how traditional UNIX operating systems use mounts of entire file systems to create file trees, and how paths are followed in such a file tree.

Following the path "/dir1/dir2/file" within a device's file system thus involves the following steps:

1. Read the file identified by inode number 2 (the device's root directory).

2. Search the directory for an entry with name = dir1.

3. Read the file identified by the inode number associated with dir1 (this is the next directory in the path).

4. Search the directory for an entry with name = dir2.

5. Read the file identified by the inode number associated with dir2 (this is the next directory in the path).

6. Search the directory for an entry with name = file.

7. The inode number associated with file in this directory is the inode number of the simple file identified by the path "/dir1/dir2/file".

The file trees which reside on individual file systems are the building blocks from which a node's aggregate file tree is built. A particular device (e.g., hard file partition) is designated as the device which contains a node's root—file system. The file tree which resides on another device can be added to the node's file tree by performing a mount operation. The two principal parameters to the mount operation are (1) the name of the device which holds the file tree to be mounted and (2) the path to the directory upon which the device's file tree is to be mounted. This directory must already be part of the node's file tree; i.e., it must be a directory in the root file system, or it must be a directory in a file system which has already been added (via a mount operation) to the node's file tree.

After the mount has been accomplished, paths which would ordinarily flow through the "mounted over" directory instead flow through the root inode of the mounted file system. A mount operation proceeds as follows:

1. Follow the path to the mount point and get the inode number and device number of the directory which is to be covered by the mounted device.

2. Create a data structure which contains essentially the following:

(a) the device name and inode number of the covered directory; and (b) the device name of the mounted device.

The path following in the node's aggregate file tree consists of (a) following the path in a device file tree until encountering an inode which has been mounted over (or, of course, the end of the path); (b) once a mount point is encountered, using the mount data structure to determine which device is next in the path; and (c) begin following the path at inode 2 (the root inode) in the device indicated in the mount structure.

The mount data structures are volatile; they are not recorded on disk. The list of desired mounts must be re-issued each time the machine is powered up as part of the Initial Program Load (IPL) The preceding discussion describes how traditional UNIX operating systems use mounts of entire file systems to create file trees and how paths are followed in such a file tree. Such an implementation is restricted to mounting the entire file system which resides on a device. The virtual file system concept described herein and in the reference material allows (1) mounting a portion of the file system which resides on a device by allowing the mounting of files (directories or simple files) in addition to allowing mounting of devices, and (2) mounting either remote or local directories over directories which are already part of the file tree. The invention described herein is an enhancement to the virtual file system concept which further allows the mounting of simple files (remote or local) over simple files which are already part of the file tree.

In the virtual file system, the operations which are performed on a particular device file system are clearly separated from those operations which deal with constructing and using the node's aggregate file tree. A node's virtual file system allows access to both local and remote files.

The management of local files is a simpler problem than management of remote files. For this reason, the discussion of the virtual file system is broken into two parts. The first part describes only local operations. This part provides a base from which to discuss remote operations. The same data structures and operations are used for both remote and local operations. The discussion on local operations describes those aspects of the data and procedures which are relevant to standalone operations. The discussion on remote operations adds information pertinent to remote operations without, however, reiterating what was discussed in the local operations section.

Figure 4:
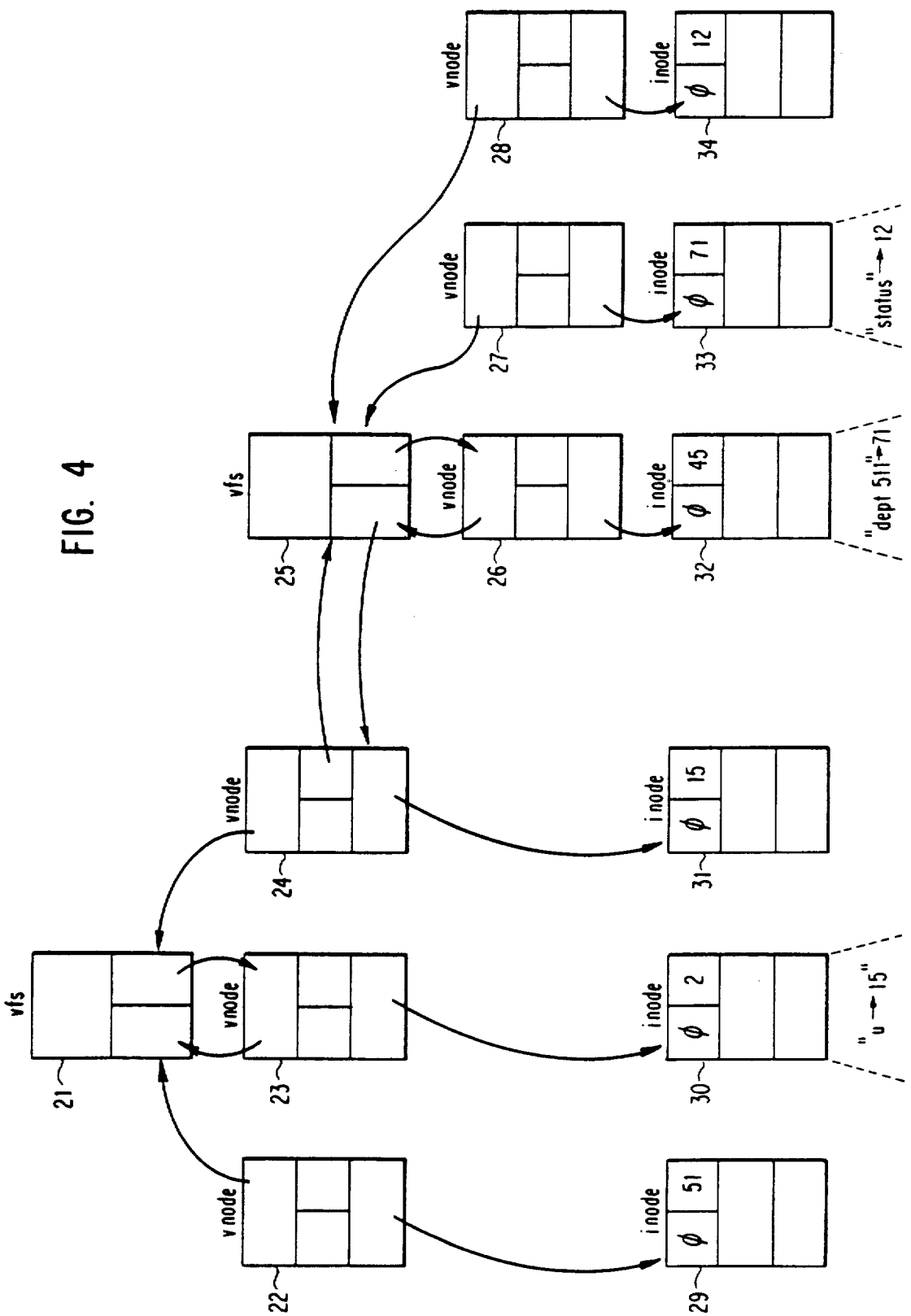
FIG. 4 is a block diagram of the data structure illustrating the scenario for following a path to a file operation at a local node as performed by the operating system which supports the subject invention.

FIG. 4 shows the relationship that exists among the data structures of the virtual file system. Every mount operation creates a new virtual file system (vfs) data structure. The essential elements in this structure are (a) a pointer to the root vnode (virtual node) of this virtual file system (e.g., the arrow from block 21 to block 23), and (b) a pointer to the vnode which was mounted over when this virtual file system was created (e.g., the arrow from block 25 to block 24).

Whenever an inode needs to be represented in the file system independent portion of the system, it is represented by a vnode. The essential elements in this structure are the following:

(a) a pointer to the vfs which contains the vnode (e.g., the arrow from block 22 to block 21);

(b) a pointer to the vfs which is mounted over this vnode (e.g., the arrow from block 24 to block 25); but note however that not all vnodes are the mount point for a virtual file system, i.e., a null pointer indicates that this vnode is not a mount point;

(c) a pointer to either a surrogate inode or a real inode (e.g., the arrow from block 26 to block 32); and (d) a pointer to a node table entry (this is a non-null only when the file is a remote file).

The AIX operating system, in common with other UNIX operating systems, keeps a memory resident table which contains information about each inode that is being used by the system. For instance, when a file is opened, its inode is read from the disk and a subset of this inode information, together with some additional information, is stored in the inode table. The essential elements of an inode table entry are (a) a pointer to the head of a file access structure list and (b) information from the disk inode, the details of which are not relevant here.

The file access structure records information about which nodes have the file open, and about the modes (read only or read_write) of these opens. There is a separate file access structure for each node which has the file open. This state information enables the server to know how each client is using the server file.

The file system supports a set of operations which may be performed on it. A process interacts with a file system by performing a file system operation as follows:

1. The user calls one of the operations providing (perhaps) some input parameters.

2. The file system logic performs the operation, which may alter the internal data state of the file system.

3. The file system logic returns to the calling user, perhaps returning some return parameters.

The operations which can be performed on a file system are referred to as "vn_operations" or "vn_ops". There are several vn_ops, but the ones which are important to this discussion are described below:

VN_LOOKUP

In the vn_lookup operation, the essential iterative step in following a path in a file system is to locate the name of a path component in a directory and use the associated inode number to locate the next file in the chain. The pseudo code for the vn_lookup operation on a local file is listed below:

```
function lookup
input: directory vnode pointer,
       name to be looked up in directory
output: vnode pointer to named file/dir.
    convert directory vnode pointer
       to an inode pointer;
          -- use pointer in vnode
    lock directory's inode;
    if( we don't have search permission in
          directory )
       unlock directory inode;
       return error;
    search directory for name;
    if( found )
       create file handle for name;
          -- use inode found in directory entry;
       get pointer to vnode for file handle;
       unlock directory inode;
       return pointer to vnode;
    else -- not found
       unlock directory inode;
       return error;
```

LOOKUPPN

The lookuppn operation is the function which follows paths. Its input is a path (e.g., "/dir1/dir2/file"), and its return is a pointer to the vnode which represents the file. Lookuppn calls vn_lookup to read one directory, then it checks to see if the vnode returned by vn_lookup has been mounted over. If the vnode is not mounted over, then lookuppn calls vn_lookup in the same file system. If the vnode has been mounted over, then lookuppn follows the pointer from the mounted over vnode (e.g., block 24 in FIG. 4) to the vfs of the mounted file system (e.g., block 25 in FIG. 4). From the vfs, it follows the pointer to the root vnode (e.g., block 26 in FIG. 4) and, if the vnode is a directory and not a simple file, issues a new vn_lookup giving as input the vfs's root vnode and the name which constitutes the next element in the path. The pseudo code for the lookuppn function is listed below:

```
function lookuppn
input: pathname
output: pointer to vnode for named file
    if( first character of path is '/' )
        current vnode for search is user's root
            directory vnode;
    else
        current vnode for search is user's
            current directory vnode;
    repeat
        if( next component of path is ".." )
            while( current vnode is root of a
                    virtual file system )
                current vnode becomes the vnode that
                    the virtual file system is mounted
                    over;
                if( there is not mounted over vnode )
                    return( error ); -- ".." past root
                                        of file system
        use vn lookup to look up path component
            in current vnode;
        if( vnlookup found component );
            current vnode becomes the vnode
                returned by vnlookup;
            while( current vnode is mounted over )
                follow current vnode's pointer to vfs
                    structure that represents the
                    mounted virtual file system;
                current vnode becomes root vnode of
                    the mounted vfs;
        else -- vnlookup couldn't file component
            return( error ); -- search failed
    until( there are no additional path
            components );
    return( current vnode );
```

The operation will be illustrated by describing the scenarios of following a path to a file and mounting a directory. First, in following a path to a file, suppose an application process issues a system call (e.g., open) for file "/u/dept54/status". This request is accomplished by the operating system in the following manner with reference to FIG. 4 (operations which are basically unchanged from the UNIX operating system are not explained here in any detail). The following assumptions are made: First, the vfs represented by block 21 is the root virtual file system. Second, the file "/u" is represented by vnode block 24 and inode block 31. Third, a previous mount operation has mounted a device's file system onto the directory "/u". This mount created the vfs represented by block 25. Fourth, all of the directories and files involved are on the same device. Fifth, the following directory entries exist in the indicated directories:

| DIRECTORY INODE NUMBER | NAME | INODE NUMBER |
|---|---|---|
| 2 | "u" | 15 |
| 45 | "dept 54" | 71 |
| 71 | "status" | 12 |

The code which implements the system call calls lookuppn to follow the path. Lookuppn starts at the root vnode (block 23) of the root virtual file system (block 21) and calls vn_lookup to look up the name "u" in the directory file represented by this vnode. Vn_lookup finds in the directory that the name "u" is associated with inode 15 in block 31. Vn_lookup must return a pointer to a vnode associated with inode 15. To do this it first brings inode 15 into the inode table. Then it checks to see if there is already a vnode in the parent vfs (the input vnode (block 23) has a pointer to the parent vfs) for this vnode. In this case there is. Vn_lookup then finds the vnode (block 24) in the root vfs (block 21) and returns a pointer to the vnode. Lookuppn discovers that the returned vnode is mounted over in the parent vfs. It follows the "mounted over" pointer from the vnode (block 24) to the mounted vfs (block 25). Lookuppn follows the "root vnode" pointer to the root vnode (block 26) of the new vfs (block 25). Lookuppn now calls vn_lookup again, this time inputting a pointer to the root vnode (block 26) and name "dept54". As before, vn_lookup reads the directory, finds the inode associated with the name, finds or creates a vnode for this inode in the parent vfs (block 25) and returns a pointer to this vnode. Lookuppn calls vn_lookup once more inputting the vnode for the just found directory and the name "status". Vn_lookup reads the directory, finds the inode associated with the name (block 34), finds or creates a vnode (block 28) for this inode in the parent vfs (block 25) and returns a pointer to this vnode. The code which implements the system call now performs the requested operation on the file.

Suppose now that an application process issues a "mount" system call to mount the file "/u/gorp" over the directory "/u/foo". The following scenario explains how this request is accomplished by the operating system (again, operations which are basically unchanged from the UNIX operating system are not explained in any detail).

Figure 6:
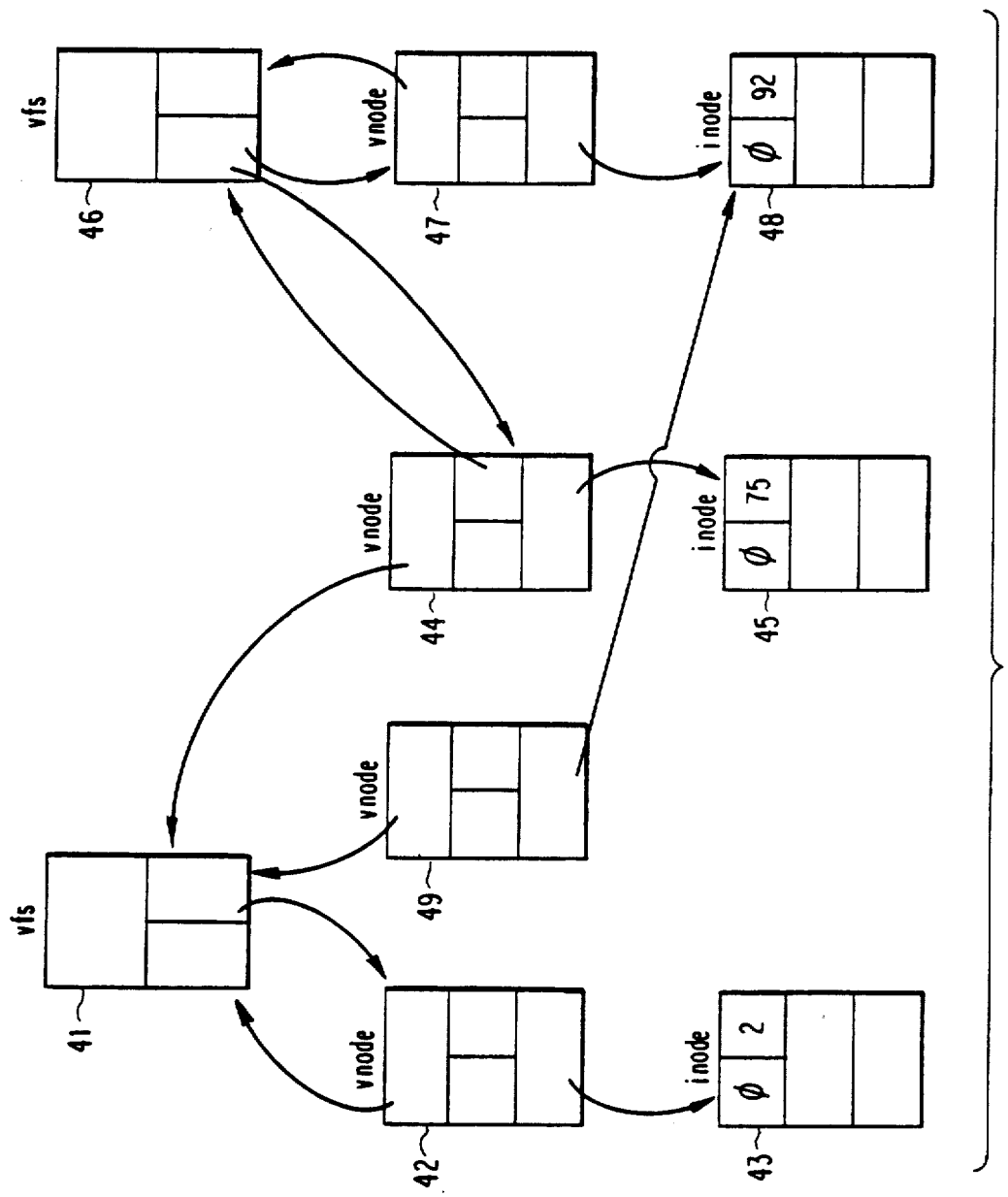
FIG. 6 is a block diagram of the data structures illustrating the after condition of the scenario for a mount file operation at a local node as performed by the operating system.
Figure 5:
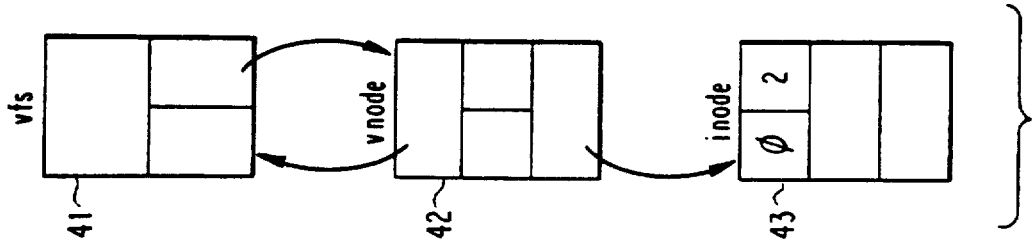
FIG. 5 is a block diagram of the data structures illustrating the before condition of the scenario for a mount file operation at a local node as performed by the operating system.

This scenario refers to FIG. 5, which represents initial conditions, and FIG. 6, which represents the final conditions, with the following assumptions: First, the vfs represented by block 41 is the root virtual file system. Second, all of the directories and files involved are on the same device. Third, the following directory entries exist in the indicated directories:

| DIRECTORY INODE NUMBER | NAME | INODE NUMBER |
|---|---|---|
| 2 | "u" | 15 |
| 2 | "etc" | 83 |
| 15 | "gorp" | 92 |
| 83 | "foo" | 75 |
| 75 | "file1" | 89 |

The code which implements the mount system call performs the following operations. Lookuppn is called to follow the path to the file which is to be mounted over ——"/etc/foo". At the completion of this operation, the root vfs (block 41) contains a vnode for "/etc/foo" (block 44) which has a pointer to the root vfs (block 41) and pointer to an inode table entry (block 45) for inode 75. Lookuppn is called to follow a path to the file which is to be mounted ——"/etc/gorp". At the completion of this operation, the root vfs (block 41) contains a vnode for "/etc/gorp" (block 49) which has a pointer to the root vfs (block 41) and a pointer to an inode table entry (block 48) for inode 92. Now the mount logic creates the new virtual file system by first creating a new vfs (block 46) and then creating a root vnode for this vfs (block 47) with a pointer back to its parent vfs (block 46) and a pointer to the root inode (inode 92, block 48) of the vfs. A "mounted over" pointer is installed in the covered vnode (block 44) in the root vfs (block 41), and a pointer to the vnode upon which it is mounted (block 44) is installed in the new vfs.

Figure 13:
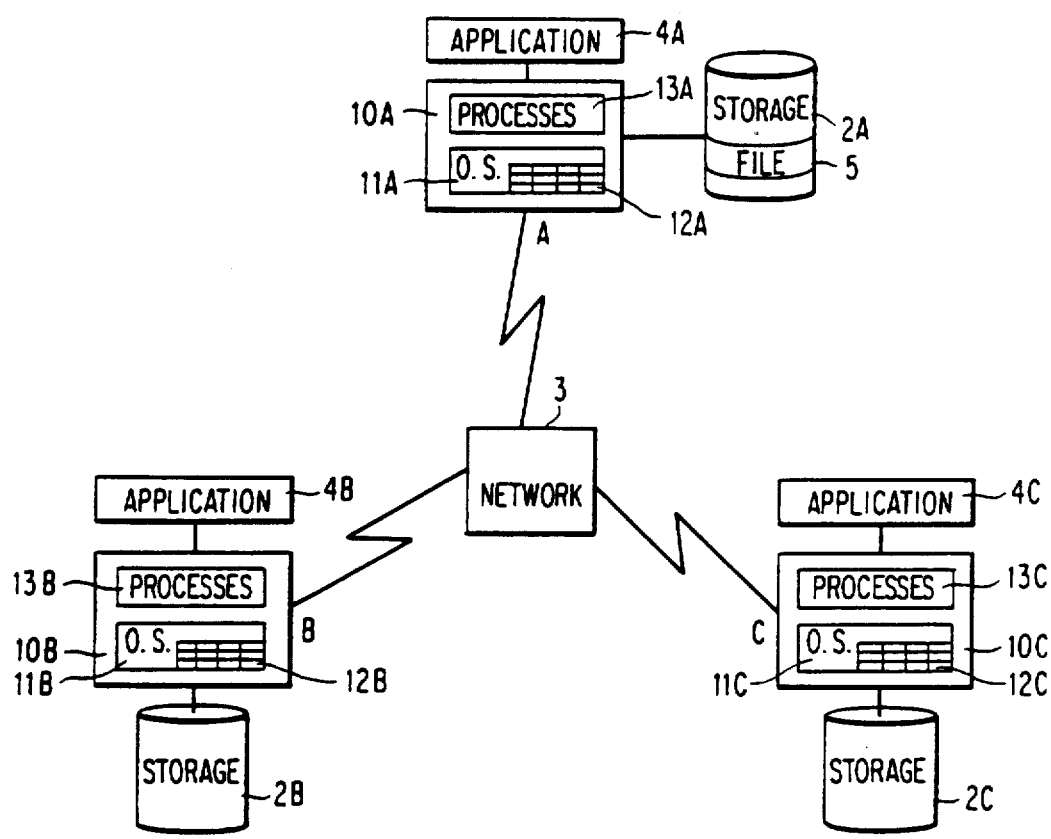
FIG. 13 is a block diagram, similar to FIG. 1, showing a distributed data processing system according to the invention.

The foregoing illustrates the data structure for standalone operation. Reference is now made to FIG. 13 which shows a distributed system similar to that shown in FIG. 1 in which the operating system which supports the present invention has been implemented. In the following description, the term "server" is used to indicate the node where a file is permanently stored, and the term "client" is used to mean any other node having processes accessing the file. It is to be understood, however, that the term "server" does not mean a dedicated server as that term is used in some local area network systems. The distributed services system in which the invention is implemented is a truly distributed system supporting a wide variety of applications running at different nodes in the system which may access files located anywhere in the system.

Figure 8:
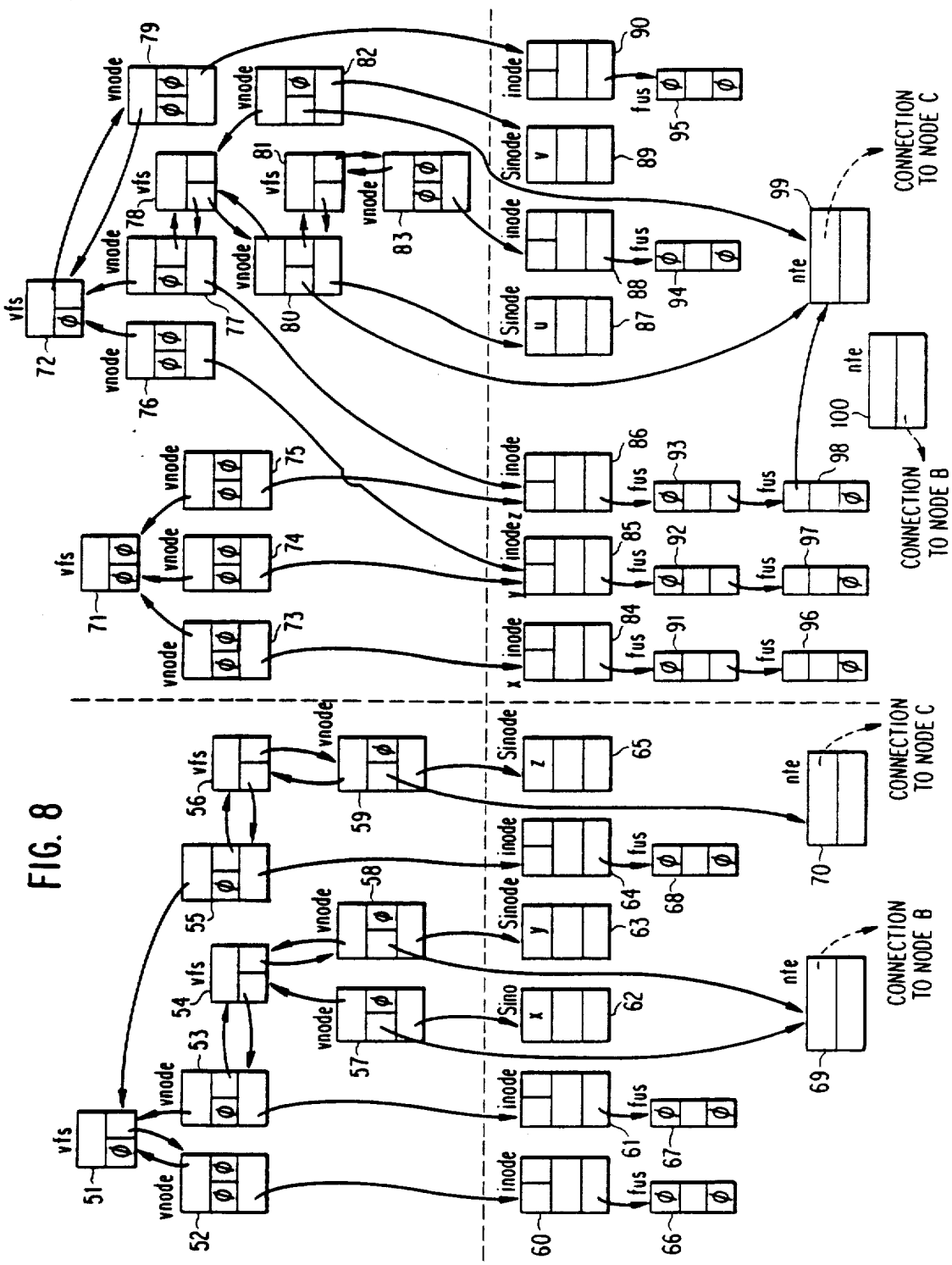
FIG. 8 is a block diagram of the data structure for the distributed file system shown in FIG. 13.

The data structure for the distributed system shown in FIG. 13 is illustrated in FIG. 8, and the component parts of that data structure are shown in FIGS. 9A to 9F. With reference to FIG. 8, a client node may have access to files which reside in a remote server node. Such a client gains access to a server's files by mounting one of the server's files. In the client node, the data structures created by a remote mount operation compare to those created by mounting a local entity in the following ways: Just as in the local case, a remote mount creates a vfs in the client node (e.g., block 54). See FIG. 9A. Just as in the local case, use of a file in a virtual file system which contains remote files creates a vnode structure in the client node (e.g., block 57). See FIG. 9B. Just as in the local case, the vnode structure has a point to a inode table entry (e.g., block 63). See FIG. 9E. The inode table entry, however, does not contain the inode information from the remote file. Instead, the inode table entry contains a surrogate inode. See FIG. 9F. This surrogate inode stands for, or represents, the remote inode.

In the server node, some data structures are constructed to allow the server to record state information about how remote nodes are using its files. More specifically, each server has a "dummy vfs" (e.g., block 71) to provide a vfs to hold files open by remote clients. The dummy vfs is not a part of the server's file tree. For each file which is open by a remote node, there is a vnode (e.g., block 74) in the server's dummy vfs. Each file which is opened by a remote node has an inode table entry in the server's inode table (e.g., block 85). This inode table entry is the same as that which exists because a local process at the server has a file open. For example, block 84, which is in the table because of a remote open, has the same structure as block 88, which is in the table because of an operation at the server.

When a client and server communicate about a server file, they need a way to identify the file. This is done with a file handle. When a client request causes the server to reply with a designation of a particular file (e.g., a remote lookup request), the file is identified by a file handle. When a client request carries a designation of a particular file (e.g., a remote open request), the file is identified by a file handle. The file handle contains the following fields: device number, inode number, and inode generation number.

The need for a file handle is illustrated by the following scenario. Suppose a client makes a request of a server and gets a file handle in reply. The client stores and remembers the file handle. Some activity at the server causes the file to be deleted and the inode slot reused for another file. The client makes a request of the server using the stored file handle. The server receives the file handle and performs the operation on the new file. This would be an unacceptable operation.

This flaw is prevented by use of the inode generation number. The inode generation number is stored on disk as a field in the inode. When the server deletes a file, it increments the inode generation number. If a request arrives at a server, the file handle is broken apart, the device number and inode number are used to locate the inode, and then the file handle inode generation number is compared to the inode's inode generation number. If they are different, then the request is rejected.

When a client wants to open a file which resides on a remote server, it uses a network transport mechanism to establish a connection with the server. Subsequent transactions regarding this file (e.g., read, write, etc.) flow on this connection. Each node contains a node table. A node uses entries in its node table (e.g., block 70) to record information about existing connections to remote nodes.

There are a limited number of operations that one node in the network can request another node to perform on its behalf. These operations are called dfs_ops. When a node makes a request of another node, the following operations occur: First, the requesting node sends a message which specifies which dfs_operation is being requested and carries the parameters appropriate to that request. Next, the receiving node receives the request and performs the specified operation. Finally, the receiving node sends a message which carries the reply parameters appropriate for the dfs_operation.

There is a close correlation between the vn_ops that are issued within a local node to a file system and the dfs_ops that are issued over the network. A typical operation on a remote file is as follows: First, a local kernel issues a vn_op, not knowing whether the file being operated on is remote or local. Second, since the file resides in a remote node, the file system implementation code sends the corresponding dfs_op to the node which holds the file. Note that if the file had been a local file, the operation would have been performed, the return parameters would have been returned, and the task would have been complete. Third, the node which holds the file receives the dfs_operation request and requests its local file system to perform the corresponding vn_operation. The return parameters from this vn_op are used to construct the return parameters for the dfs_op. Fourth, the requesting node receives the dfs_op reply from the server node and uses the dfs_op return parameters to construct the return parameters to the original vn_operation request.

Figure 10:
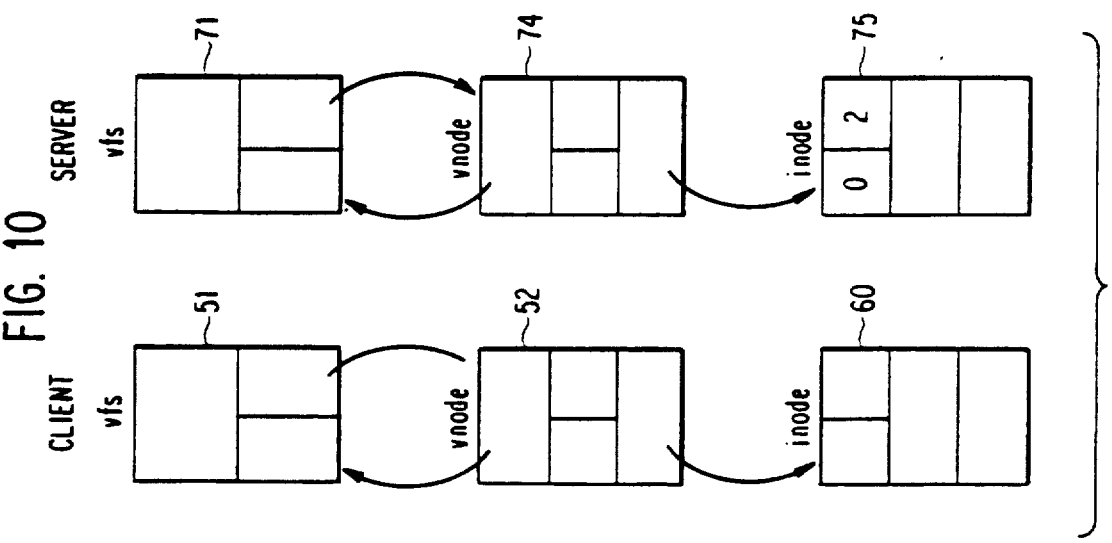
FIG. 10 is a block diagram of the initial conditions of the data structures illustrating the scenario for a mount file operation.

The operation will be illustrated by describing the scenarios of mounting a remote file over a local file and following a path to a file. In the first scenario, suppose that an application process in a client node issues a "mount" system call to mount a server node's file "/u/gorp" over the local client file "/etc/foo". The following scenario explains how this request is accomplished. This scenario refers to FIG. 10, which represents the initial conditions, and to FIG. 11, which represents the final condition, with the following assumptions: The vfs represented by block 51 is the root virtual file system of the server's file tree, and all the server directories and files involved are on the same device. The following entries exist in the indicated directories:

| DIRECTORY INODE NUMBER | NAME | INODE NUMBER |
|---|---|---|
| | Server Node | |
| 2 | "u" | 15 |
| 15 | "gorp" | 92 |
| 92 | "file 2" | 67 |
| | Client Node | |
| 2 | "etc" | 83 |
| 83 | "foo" | 75 |

Figure 11:
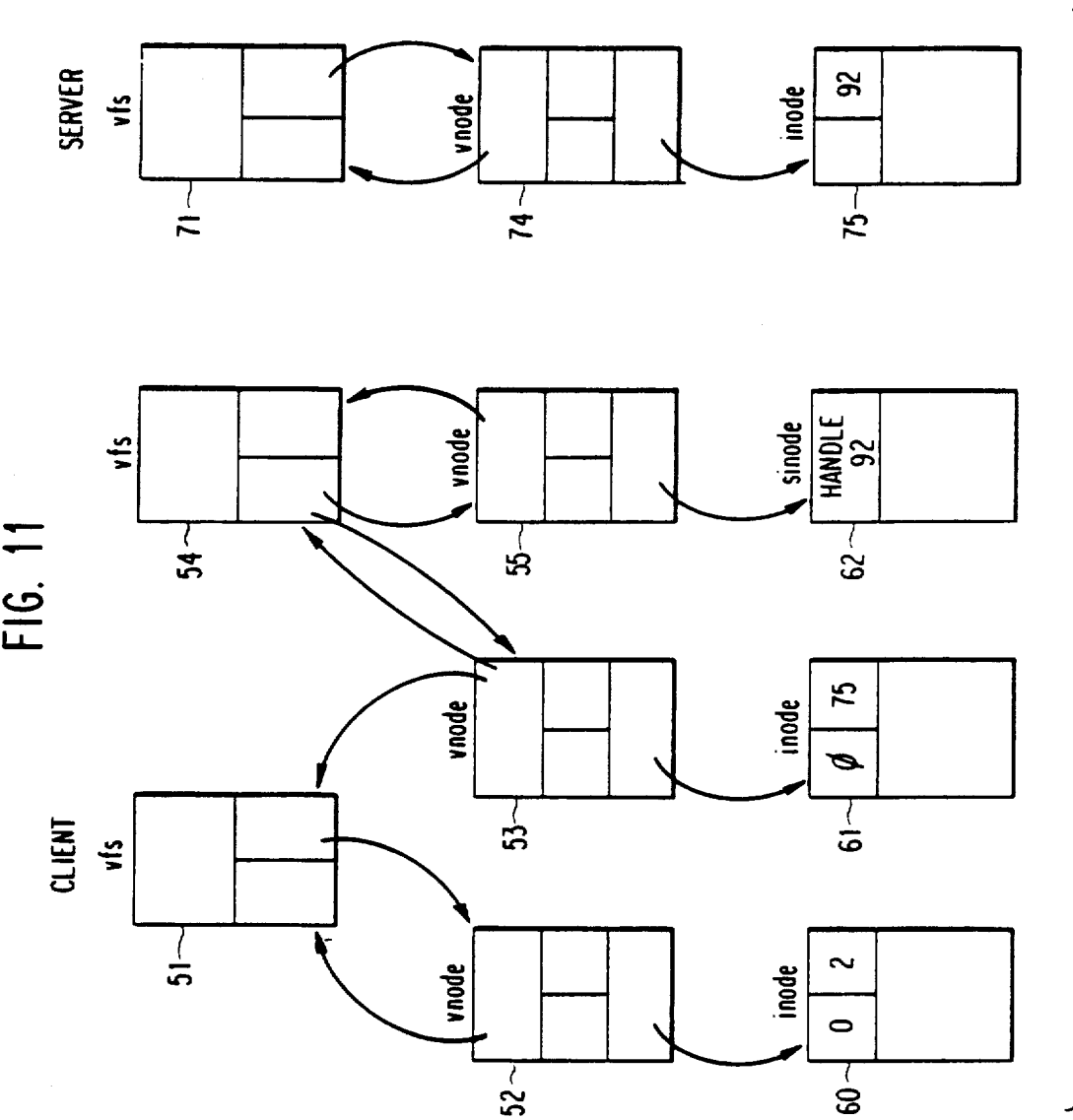
FIG. 11 is a block diagram of the final conditions of the data structures illustrating the scenario for a amount file operation.

The code which implements the mount system calls lookuppn to follow the path to the file which is to be mounted over —"/etc/foo". At the completion of this operation, as shown in FIG. 11 the root vfs (block 51) contains a vnode for "/etc/foo" (block 53) which has a pointer to the root vfs (block 51) and a pointer to an inode table entry (block 61) for inode 75. Since the file being mounted resides in a remote node, a_dfs_mount request is issued to the server node, passing the path "/u/gorp" as the path to the object to be mounted. Upon receiving the dfs_mount request, the server node calls lookuppn to follow the path to the file which is to be mounted —"/u/gorp". At the completion of this lookup operation, the server's root vfs (block 71) contains a vnode (block 74) for "/u/gorp" which has a pointer to the root vfs and pointer to an inode table entry for inode 94 (block 75). The server uses the information in the inode (device 0, inode 92) to construct a file handle for the file "/u/gorp". The server returns this file handle in the reply to the dfs_mount request and then releases the vnode and inode. Finally, the client receives the file handle in the reply to the dfs_mount request and performs the operations necessary to create the new virtual file system as follows:

(a) Create a new vfs (block 54).

(b) Create a root vnode for this vfs (block 55) with a pointer back to its parent vfs (block 54) and a pointer to the root inode of the vfs (block 62). Since the root inode of this vfs is a remote file, the inode pointed to from the root vnode is a surrogate inode. This surrogate inode contains the file handle returned by the server in response to the client's dfs_mount request.

(c) Install a "mounted over" pointer in the covered vnode (block 53) in the root vfs (block 51).

(d) Install in the new vfs (block 54) a pointer to the vnode upon which it is mounted (block 53).

Figure 12:
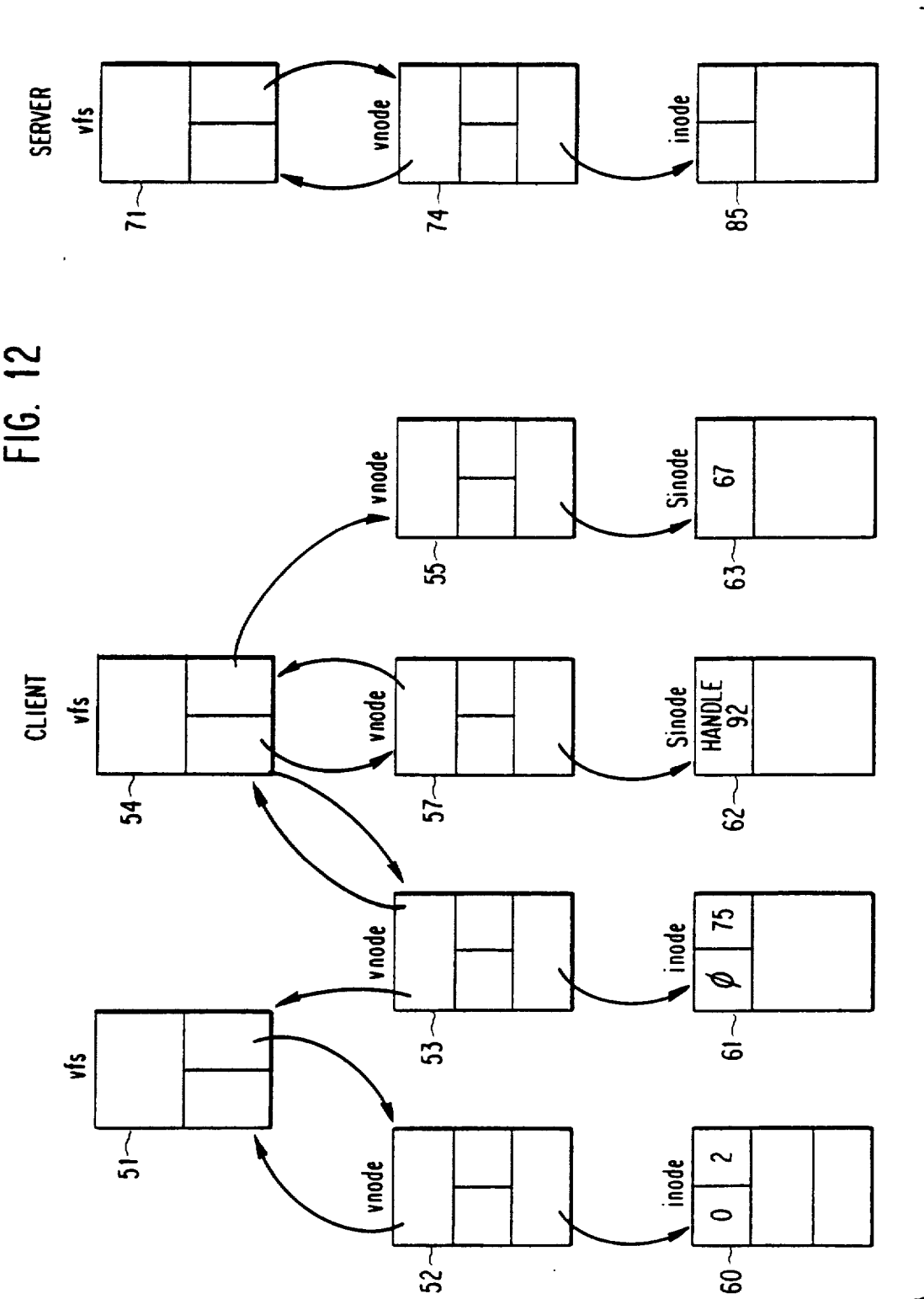
FIG. 12 is a block diagram of the data structures for a mount file operation illustrating the process of following a path to a file at a local and remote node in a distributed system as performed by the operating system.

Suppose now that after executing the remote mount described above (mount server /u/gorp over client /etc/foo) a client process issues a system call to operate on the file "/etc/foo/file2". The block numbers in the following scenario refer to FIG. 11, which represents initial conditions and FIG. 12, which represents the system state after the open operation. First, the code which implements the system call calls lookuppn to follow the path. Lookuppn starts at the root vnode (block 52) of the root virtual file system (block 51) and calls vn_lookup to look up the name "u" in the directory file represented by this vnode. Vn_lookup finds in the directory that the name "u" is associated with inode 15. Vn_lookup constructs a vnode and inode in the root virtual file system for inode 15 and returns to lookuppn a pointer to this vnode. Lookuppn calls vn_lookup again, this time to look up the name "foo" in the directory identified by inode 15. Vn_lookup reads the indicated directory and discovers that the name "foo" is associated with inode 75 in block 61. There already exists in the root vfs (block 51) a vnode (block 53) for this inode (block 61), so vn_lookup returns a pointer to this vnode. Lookuppn discovers that the vnode is mounted over (the "mounted over" pointer in block 53 points to block 54). Lookuppn thus follows the "mounted over" pointer to the next vfs (block 54) and follows its root vnode pointer to the root vnode (block 55) of the virtual file system. Lookuppn now calls vn_lookup for the next element ("file2") of the path giving vn_lookup a pointer to block 55 and the name "file2". The directory to be searched resides in a remote node and is identified by the file handle stored in the client surrogate inode (block 62). Vn_lookup issues a dfs_lookup to the server which holds the file, sending the file handle which identifies the directory and the name ("file2") which is to be looked up. When the server receives the dfs_lookup, it uses the file handle to identify the directory to be read and issues a vn_lookup to search for the name "file2" in this directory. Vn_lookup reads the directory and discovers that the inode number associated with the name "file2" is 67. Vn_lookup constructs a vnode and inode in the dummy virtual file system for inode 67 and returns to lookuppn a pointer to this vnode. Dfs_lookup uses the information in data structures returned by vn_lookup to construct a file handle for the file identified by inode 67. It returns this file handle to the client, as the reply to the dfs_lookup request, and releases the vnode and inode. In the client, a vnode (block 55) and surrogate inode (block 63) are created for the found file. Since "file2" is the last piece of the path, lookuppn returns to its caller a pointer to the found vnode (block 55). The code which implements the system call now performs the requested operation on the file. It will be appreciated from the foregoing discussion that the effect of the mount operation is to bind the contents of the mounted file (which may be either local or remote to the user's current node) to the name of the "mounted over" file in the user's file tree, by means of a "mounted over" pointer and other information added to the vnode representing the "mounted over" file. The result is a file tree which can be traversed by the operating system, application programs and users without any knowledge at all as to the physical locations of the files represented in the file tree.

Figure 7A:
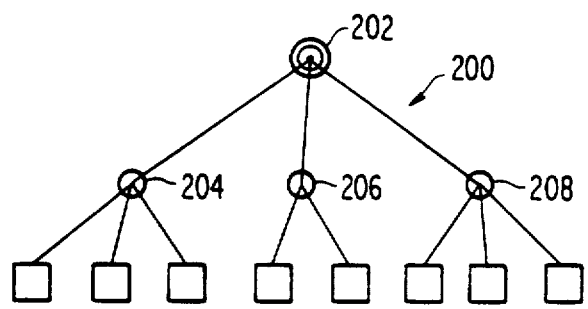
FIG. 7A shows a file tree whose immediate decendents are all directories.
Figure 7B:
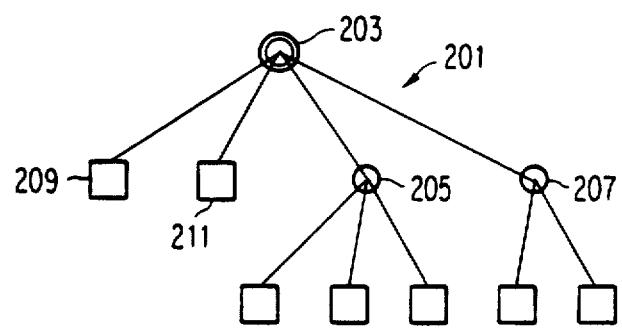
FIG. 7B shows a file tree whose immediate decendents are a collection of directories and simple files.
Figure 7C:
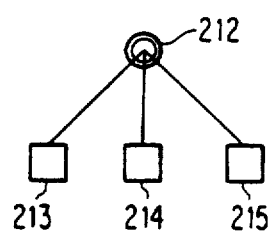
FIG. 7C shows a file tree whose immediate decendents are all simple files.

Referring to FIG. 7A, 7B, 7C, the mounting technique described above allows file trees 200, 201 to be constructed in which a directory 202, 203 in a node contains descendants which reside in different nodes. For example:

(a) a directory 202 could have several immediate descendant directories 204, 206, 208 and any of these descendants 204, 206, 208 could reside in any node in the network (b) a directory 203 could have several immediate descendant directories 205, 207 and several immediate descendant simple files 209, 211. Any of these descendants could reside in any node in the network (c) a directory 212 could have several immediate descendant simple files 213, 214, 215 and any of these descendants could reside in any node in the network.

SINGLE SYSTEM IMAGE

A single system image refers to the method of providing a unique environment for each user that is consistent regardless of the node that the user is currently logged on to. That means that user X will have a different view of the system than user Y; however, user X is provided with the same view of the system and the files that s/he normally uses when s/he is logged on to node A as when s/he is logged on to node B. To implement the single system image in a distributed environment and circumvent burdening the system with the management of multiple system files, a single copy of five master system files are shared by every node. These files are /etc/passwd, /etc/opasswd, /etc/group, /etc/ogroup and /etc/motd. In order to understand how the files are used in a single system image distributed environment, it is necessary to understand their operation in a UNIX operating system standalone system.

Every UNIX operating system has a file /etc/passwd that contains all the login information concerning each user. The fields in the /etc/passwd are laid out as shown below:

LOGIN-ID / ENCRYPTED PASSWORD / USER-ID / GROUP-ID / MISCELLANY / LOGIN-DIRECTORY / SHELL

The first field, the login-id contains a user's login name identification. The second field contains the encrypted password which is designed to readily accommodate the encryption of a user's alphanumeric password but make it very difficult to transform the encrypted version of the password back to the alphanumeric version. The third field identifies the user's ID number employed by the system. The fourth field identifies the user's group-id. This field is used to identify the group of files that a particular user has permission to read, write and/or execute. The miscellany field may contain any additional character information further identifying the user. Information such as name and telephone number is often found in this field. The login-directory field contains the information defining what the user's default directory is. The final field, the shell field, contains the default shell that the user will execute under.

The fields in the /etc/passwd file are used by the UNIX operating system to set up and control a user's environment. Another file that is also responsible for controlling a user's environment in less of a direct fashion is the /etc/group file. This file encodes group names and group-ids, and defines which users are in which groups. The /etc/passwd file only identifies the login group; the /etc/group file defines which groups of files a user is authorized to use. The system determines what files a user can access on the basis of the permission granted by your USER-ID number and the user's GROUP-ID and the information in the /etc/group file.

The format of the /etc/group file is:

GROUP NAME / ENCRYPTED PASSWORD / GROUP-ID / LIST OF ALL USERS IN THE GROUP

The GROUP NAME is an alphanumeric name associated with the group. The ENCRYPTED PASSWORD is similar to the password in the /etc/passwd file and protects access to the group information. The LIST OF ALL USERS IN THE GROUP is a list of all the users that are in this user group. Each file in the UNIX operating system has a unique owner and GROUP-ID associated with it, what permissions the owner has for the file, and what permissions the group has for the file. The allowable permissions are read, write and execute. When a user logs-onto the system, the system takes the user's user name and looks up the user's user-id and group-id in the /etc/passwd file. Then the system searches the /etc/group file to determine the additional groups in which the user is a member. This set of additional groups is called the user's concurrent group list. The user's user-id, group-id, and concurrent group list determine the files that the user is authorized to access. The concurrent group list contains all of the groups a user is a member of in addition to the group identified by the user's group-id.

The /etc/opasswd and /etc/ogroup files are copies of the /etc/passwd and /etc/group files before the last update of the files. They are backup files in case the /etc/group or /etc/passwd files are inadvertently destroyed. One additional file is also necessary to provide remote operation, the /etc/motd file. The /etc/motd file is the message of the day file. When a user logs on to the UNIX operating system, a message is displayed providing information for the day. In order to allow users at the remote nodes to get the logon message, /etc/motd must be mounted.

The single system image is implemented by keeping only one master copy of the system files described above. These copies are kept at the MASTER node. Each node has a file of instructions which are executed at system IPL (initial program load) time. The administrator places procedures in this file to mount the MASTER system's files over the node's own local copies of these files at IPL of the system. These IPL procedures that are executed by nodes where the master files do not reside are shown below using the /etc/passwd file as an example of one of the five remote mounted system files:

(1) Create a Stub File. Note: A stub is a file or directory created as a point upon which other files or directories may be mounted.

(2) Mount the MASTER's /etc/passwd onto the stub as described above. (This step creates a path to the master file.)

(3) Copy the MASTER's /etc/passwd into the local /etc/passwd file.

(4) Unmount the MASTER's /etc/passwd file and delete the stub file.

(5) Mount the MASTER's /etc/passwd over the local /etc/passwd file.

Once the procedure has been repeated for the other four system files, the node will be using the same files as the master. Standard UNIX operating system commands, such as the ADDUSER(1) command which alters the /etc/passwd or /etc/group file can now be run from either the MASTER or remote node (with proper authorization).

The above example, in which several nodes share the same copy of the /etc/passwd file, uses mounting of simple files over simple files. A simple file over simple file mount (as opposed to a directory over directory mount) is necessary in this case because of the following:

First, many programs in the system are designed to assume that the path to the password file is "/etc/passwd". If the password file were moved to a different directory, e.g., "/etc/remote/passwd", all of these programs would have to be changed. This would be a significant inconvenience for users, programmers, and administrators.

Second, there are many different system configuration files in the /etc directory. In the single system image case several of these files, e.g., /etc/master must be local files unique to each non-master machine, and several of them, e.g., /etc/passwd, must be shared from the master machine.

An attempt to give the non-master machine access to the master's /etc/passwd file by using a directory over directory mount would either cause the non-master machine's entire /etc directory to become covered by the master's /etc directory, or require the non-master to access the passwd file with a different path, e.g., /etc/master/passed. The first is unacceptable because it would also hide the non-master's local configuration files (e.g., /etc/master). The second is unacceptable because it would change the path that programs and operators use to access the passwd file.

In a distributed single system image environment, the network administrator arranges the file trees of each user so that the same directories and files are seen regardless of which node the user is logged on to. The file tree provides the capability of logging on from any machine and providing an identical interface from any node, and in effect provides a single system image of the environment from any of the nodes. The previously described remote mount capabilities allow the administrator to build a file tree as described above. An example of a file tree arrangement and the steps necessary to implement the tree is provided below:

In the example, there are three nodes, DEPT544_A, DEPT544_B and DEPT544_C. Shared department resources are held in the directory /DEPT544 in node DEPT544_A. User JOE's files are held in the directory /U/JOE in node DEPT544_B. To setup the single system image file tree described above, the network administrator would set up empty stub directory /DEPT544 in DEPT544_B and DEPT544_C and perform a remote mount mounting DEPT544_A's /DEPT544 over the local stub directory in each of the two nodes. In addition, the network administrator would set up empty stub directory /U/JOE in DEPT544_A and DEPT544_C and perform a remote mount mounting DEPT544_B's directory /U/JOE over the local stub directory in each of the two nodes. In this way, the network administrator uses remote mounts to create a single system image of the distributed environment which uniquely defines the environment for each user.

A combination of the remote mounting of the five system files and the usage of a single system image file tree to provide an identical interface from multiple nodes provides a single system image to be enabled when the MASTER is active. When the MASTER is not available, the remote node uses its own system files in read only mode until the MASTER is available. This is the reason that a stub file is employed when the initial remote mounts of the system files are performed. If the MASTER is unavailable, then the local /etc/passwd file and other system files are still accessible by the system and system operations continue normally until the MASTER is available. However, no local update of the system files would be allowed until the remote mount of the MASTER file were successfully accomplished.

While the invention has been described in terms of a preferred embodiment in a specific operating system environment, those skilled in the art will recognize that the invention can be practiced, with modification, in other and different operating systems within the spirit and scope of the appended claims.

Having thus described our invention, what we claim as new and desire to secure by Letters Patent is set forth in the following claims:

1. A data processing system having a hierarchical file system and connected at a local node to at least one remote node by a communication link, said data processing system comprising:
   at least one file in the hierarchical file system located in at least one of said at least one remote node;
   a directory file in said local node, said directory file having at least one immediate descendent file for which said directory file is a parent file;
   means for mounting, in the data processing system, the at least one file in said at least one remote node to a local name of the at least one immediate descendent file in said local node, while preserving the contents of the at least one immediate descendent file, said means for mounting causing a path name to be associated with at least one portion of the hierarchical file system; and
   means for accessing, by an application unaware of the location of the at least one file, contents of the mounted at least one file in said at least one remote node by using said local name.

2. The data processing system as recited in claim 1 wherein said decendent file is a simple file.

3. The data processing system as recited in claim 1 wherein said decendent file is a directory file.

4. A data processing system having a hierarchical file system, said data processing system comprising:
   at least one file in said hierarchical file system;
   a directory file having at least one immediate descendent file for which said directory file is a parent file; and
   means for mounting, in the data processing system, the at least one file over a name of the at least one immediate descent file while preserving the contents of the at least one immediate descendent file, said means for mounting causing a path name to be associated with at least one portion of the hierarchical file system; and
   means for accessing, by an application unaware of the location of the at least one file, contents of the mounted at least one file by using said name.

5. A method, performed by a computer, of accessing a remote file from a local node in a data processing system having a hierarchical file system, said method comprising:
   mounting, in the data processing system, the remote file at a remote node over a local file at the local node while preserving the contents of the local file, said step of mounting causing a path name to be associated with at least one portion of the hierarchical file system; and accessing, by an application unaware of the location of the remote file, the remote file at the local node through a path to the local file.

6. The method of claim 5 further comprising the step of copying the remote file to the local file before mounting the remote file over the local file.

7. The method of claim 6 wherein the step of copying further comprises the steps of:
mounting the remote file over a stub file;
copying contents of the remote file to the local file; and
unmounting the remote file.

8. A method, performed by a computer, of accessing a second file in a data processing system having a hierarchical file system, said method comprising the steps of:
mounting ,in the data processing system, the second file over a first file while preserving the contents of the first file, said step of mounting causing a path name to be associated with at least one portion of the hierarchical file system; and
accessing, by an application unaware of the location of said second file, the second file through a path to the first file.

9. The method of claim 8 further comprising the step of copying the second file to the first file before mounting the second file over the first file.

10. The method of claim 9 wherein the step of copying further comprises the steps of:
mounting the second file over a stub file;
copying contents of the second file to the first file; and
unmounting the second file.

11. In a data processing system having a plurality of nodes comprising a plurality of system files containing characteristics of the data processing system, at least one set of sad system files being a master set of system files, a hierarchal file system having a plurality of user directories and files for a plurlaity ofusers and a file of default file tree organizations for each of said users, a method, performed by a computer, of creating a single system image unique for each user on each of said plurality of nodes comprising:
maintaining a file of default file tree organizations for each of said plurality of users;
creating a set of stub files at each of said plurality of nodes;
mounting said master set of system files onto said set of stub files to create a path from each of said nodes to said masters set of system files, said step of mounting causing a path name to be associated with at least one portion of the hierarchical file system;
copying said master set of system files into system files of said plurality of nodes;
unmounting said master set of system files;
deleting said set of stub files;
mounting said master set of system files over said system files of said plurality of nodes; and
creating a default file tree for each of said users according to the default file tree organizations to give each user a unique view of the system individual to that user, said unique view for the user being identical for that user at every node in the system.

12. The method according to claim 11 further comprising the steps of:
using said plurality of system files in read only mode to continue to give each of said users a same file interface if said master set of system files are unavailable; and
mounting said master set of system files over said system files of said plurality of nodes when the master set is again available.

13. The method according to claim 11 wherein said step of creating a default file tree for each of said users comprises the steps of:
retrieving said file of default file tree organizations for said plurality of users;
determining which of said user directories and files are contained on another of said plurality of nodes in an organization of said default file tree;
creating stub directories for each of said user directories and files contained on another of said plurality of nodes; and
mounting said user directories and files over said local stub directories to allow said user to have an identical view of the system as would be obtained from any other node in the system by that user.

14. A data processing system having a plurality of named files in a hierarchical file system and having a connection at a local node to at least one remote node by a communication link, said data processing system comprising:
means for mounting, in said data processing system, at least one file located at one of said at least one remote node to a local name of a named file located at said local node, while preserving the contents of said named file, said means for mounting causing a path name to be associated with at least one portion of the hierarchical file system; and
means for using said local name of said named file located at said local node, by an application unaware of the location of said mounted at least one file located at one of said at least one remote node, to access contents of said mounted at least one file.

15. A data processing system having a plurality of named files in a hierarchical file system, said data processing system comprising:
at least one first file;
at least one second file having a name;
means for mounting, in said data processing system, said first file to said name of said at least one second file, while preserving the contents of said second file, said means for mounting causing a path name to be associated with at least one portion of the hierarchical file system;
means for using, after said mounting, by an application unaware of the location of said at least one first file, said name to access the contents of said at least one first file;
means for unmounting, in said data processing system, said at least one first file from said name; and
means for using, after said unmounting, said name by an application to access the preserved contents of said at least one second file.

16. A method, performed by a data processing system, of accessing from a local node a remote file in a hierarchical file system residing at a remote node connected to said local node by a communication link, said method comprising:
mounting, by said data processing system, said remote file to a local name of a named file residing at said local node while preserving the contents of said named file, said means for mounting causing a path name to be associated with at least one portion of the hierarchical file system; and using said local name, by an application unaware of the location of said remote file, to access contents of said remote file.

17. A method, performed by a data processing system, of accessing a first file in a hierarchical file system, said method comprising the steps of:
- mounting, by said data processing system, said first file to a name of a second file, while preserving the contents of said second file, said step of mounting causing a path name to be associated with at least one portion of the hierarchical file system;
- using, after said mounting, said name by an application unaware of the location of the first file to access contents of said first file;
- unmounting, by said data processing system, said first file from said name; and
- using, after said unmounting, said name by an application to access the preserved contents of said second file.

18. A computer program product having a computer readable medium having a computer program recorded thereon for use in a data processing system for accessing from a local node a remote file in a hierarchical file system residing at a remote node, wherein said local node is connected to at least one remote node by a communication link, said computer program product comprising:
- program code means for causing a mounting, by said data processing system, of said remote file to a local name of a named file residing at said local node while preserving the contents of said named file, said mounting causing a path name to be associated with at least one portion of the hierarchical file system; and
- means for using said local name, by an application unaware of the location of said remote file, to access contents of said remote file.

19. A computer program product having a computer readable medium having a computer program recorded thereon for use in a data processing system for accessing a file in a hierarchical file system, said computer program product comprising:
- program code means for causing a mounting, by said data processing system, of a first file to a name of a second file while preserving the contents of said second file, said mounting causing a path name to be associated with at least one portion of the hierarchical file system;
- means for using, after said mounting, said name by an application unaware of the location of said first file to access contents of said first file;
- means for unmounting said first file from said name of said second file; and
- means for using, after said unmounting, said name by an application to access the preserved contents of said second file.

20. A distributed data processing system including a hierarchical file system and having a plurality of nodes interconnected by a communication link said distributed data processing system comprising:
- a named directory having at least one shared file containing information for use by said plurality of nodes;
- at least one unique local file, residing in said named directory, containing information for use by at least one local node of said plurality of nodes;
- means for mounting, by said distributed data processing system, in said at least one local node, one of said at least one shared file residing at at least one remote node of said plurality of nodes, over a named file in said named directory at said local node, while maintaining said at least one unique local file at said local node, said means for mounting causing a path name to be associated with at least one portion of the hierarchical file system;
- means for using, from any one of said at least one local node, a first path through the named directory and the named file to access the mounted at least one shared file; and
- means for using, from any one of said at least one local node, a second path thorough the named directory to access the at least one unique local file of said local node.

21. The system of claim 20 wherein said means for using a first path accesses the mounted at least one shared file from any one of said at least one local node through a path/etc/passwd.

22. The system of claim 20 wherein said means for using a first path accesses the mounted at least one shared file from any one of said at least one local node through a path/etc/group.

23. The system of claim 20 wherein said means for using a first path accesses the mounted at least one shared file from any one of said at least one local node through a path/etc/motd.

24. A system of claim 20 wherein one of said at least one shared file is mounted over a same named file in each of said plurality of nodes, and said at least one shared file is accessed through a same first path from each of said plurality of nodes.

25. A system of claim 20 further comprising means for accessing, by a user, a same plurality of files from any one of said nodes in a consistent manner independent of where any one of said plurality of files resides, and independent of the node that the user is currently using, whereby said user has a single system image from any one of said nodes.

* * * * *